US009696141B2

(12) United States Patent
Sezerman et al.

(10) Patent No.: US 9,696,141 B2
(45) Date of Patent: Jul. 4, 2017

(54) METHOD AND SYSTEM FOR SIMULTANEOUS MEASUREMENT OF STRAIN AND TEMPERATURE UTILIZING DUAL CORE FIBER

(71) Applicant: OZ OPTICS LTD., Ottawa (CA)

(72) Inventors: Omur Sezerman, Kanata (CA); Lufan Zou, Kanata (CA)

(73) Assignee: OZ OPTICS LTD., Ottawa (CA)

( * ) Notice: Subject to any disclaimer, the term of this patent is extended or adjusted under 35 U.S.C. 154(b) by 0 days.

(21) Appl. No.: 15/236,000

(22) Filed: Aug. 12, 2016

(65) Prior Publication Data

US 2016/0349121 A1    Dec. 1, 2016

Related U.S. Application Data

(63) Continuation of application No. 14/705,424, filed on May 6, 2015, now Pat. No. 9,568,307.

(30) Foreign Application Priority Data

May 6, 2014    (CA) ..................... 2851047

(51) Int. Cl.
| | |
|---|---|
| *G01B 11/16* | (2006.01) |
| *G01L 1/24* | (2006.01) |
| *G01K 11/32* | (2006.01) |
| *G02B 6/02* | (2006.01) |
| *G02B 6/26* | (2006.01) |
| *G02B 6/32* | (2006.01) |

(Continued)

(52) U.S. Cl.
CPC .............. *G01B 11/16* (2013.01); *G01B 11/18* (2013.01); *G01D 1/00* (2013.01); *G01K 11/32* (2013.01); *G01L 1/24* (2013.01); *G01L 1/242* (2013.01); *G02B 6/02042* (2013.01); *G02B 6/264* (2013.01); *G02B 6/32* (2013.01); *G01D 5/35364* (2013.01); *G01K 2011/322* (2013.01)

(58) Field of Classification Search
CPC ........ G01B 11/16; G01B 11/18; G01K 11/32; G01K 2011/322; G01D 5/35348; G01D 5/35354; G01D 5/35364; G01D 5/3537; G01D 5/3538; G01D 1/00; G01M 11/083; G01M 11/085; G01L 1/242; G01L 1/243; G01L 1/24; G02B 6/02042; G02B 6/264; G02B 6/32

See application file for complete search history.

(56) References Cited

U.S. PATENT DOCUMENTS

| | | | |
|---|---|---|---|
| 6,813,403 B2 | 11/2004 | Tennyson | |
| 7,543,982 B2 * | 6/2009 | Yamamoto | ............. G01B 11/18 356/32 |

(Continued)

*Primary Examiner* — John M Bedtelyon
(74) *Attorney, Agent, or Firm* — Zarley Law Firm, P.L.C.

(57) ABSTRACT

There is provided a system for measuring temperature and strain simultaneously utilizing Brillouin Scattering within an optical fiber. The system has a cladding, a first optical core within the cladding and a second optical core within the cladding and having a different refractive index profile and/or composition than the first core. Means to couple light into and out of said individual optical cores and/or from one optical core to the other within the fiber is provided along with means for calculating strain and temperature characteristics based on measured Brillouin frequencies for said optical cores.

2 Claims, 4 Drawing Sheets

(51) Int. Cl.
    *G01D 1/00*    (2006.01)
    *G01D 5/353*    (2006.01)

(56) References Cited

U.S. PATENT DOCUMENTS

| | | | |
|---|---|---|---|
| 7,599,047 B2 * | 10/2009 | Zou | G01B 11/18 356/32 |
| 2003/0174924 A1 | 9/2003 | Tennyson | |
| 2008/0084914 A1 | 4/2008 | Yamamoto et al. | |
| 2014/0042306 A1 | 2/2014 | Hoover et al. | |

* cited by examiner

METHOD AND SYSTEM FOR SIMULTANEOUS MEASUREMENT OF STRAIN AND TEMPERATURE UTILIZING DUAL CORE FIBER

CROSS REFERENCE TO RELATED APPLICATION

This is a Continuation Application of U.S. application Ser. No. 14/705,424 filed May 6, 2015, which claims the benefit of Canadian Application Serial No. 2,851,047 filed May 6, 2014.

TECHNICAL FIELD

The present invention relates to a method and system for the simultaneous measurement of strain and temperature utilizing a dual core fiber.

BACKGROUND OF THE INVENTION

Co-owned U.S. Pat. No. 7,599,047 B2 describes a method and a system that utilizes a pair of fibers connected or installed together, with one of the fibers having a refractive index profile or waveguide composition that differs from that of the other fiber. By measuring the Brillouin frequency shift along each of the fibers and by determining coefficients of Brillouin frequency shift versus strain and temperature for each of the fibers, one can measure strain and temperature along the fiber lengths.

The main drawback of this patent for field applications is that the fibers need to be installed with great care, to ensure both fibers experience the same strains and temperature at matching points. If one fiber is not experiencing the same conditions as the other fiber along the measurement region of interest, the measured strain and temperature values will be incorrect.

SUMMARY

In accordance with one aspect of the present invention, there is provided an optical fiber comprising a cladding and a first core within the cladding. A second core within the cladding has a different refractive index than the first core.

In accordance with another aspect of the present invention, there is provided a system for measuring temperature and strain simultaneously utilizing Brillouin Scattering within an optical fiber comprising a cladding and a first optical core within the cladding. A second optical core within the cladding has a different refractive index profile and/or composition than the first core.

Means to couple light into and out of the individual optical cores and/or from one optical core to the other within the fiber is provided along with means for calculating strain and temperature characteristics based on measured Brillouin frequencies for the optical cores.

BRIEF DESCRIPTION OF THE DRAWINGS

The following description will be better understood with reference to the drawings in which.

DESCRIPTION OF THE PREFERRED EMBODIMENTS

Figure 1:
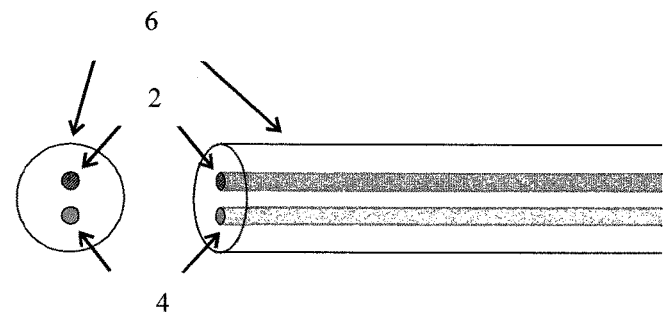
FIG. 1 shows a dual core fiber structure.

The invention consists of a special fiber that has two cores 2, 4 within the same cladding 6 forming separate waveguides, as shown in FIG. 1. The fiber is constructed so that the two cores 2, 4 have different refractive index profiles and/or compositions. Therefore each core will have different coefficients for Brillouin frequency shift versus strain and temperature. Because both waveguides are within the same fiber cladding 6, one can easily install the fiber in the field. Both waveguides experience the same temperature and strains because they are within the same cladding 6. The cladding shape also matches that of conventional fiber, which also aids in its installation.

Figure 2A:
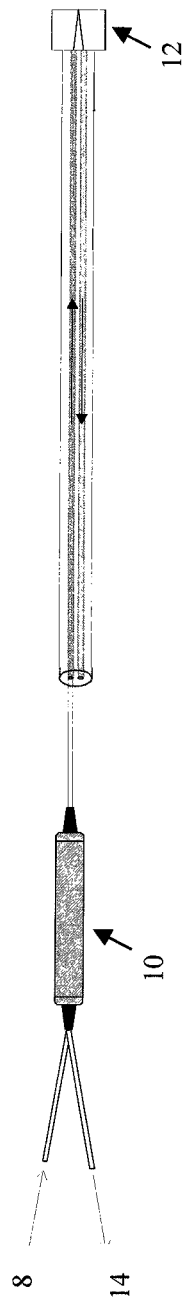
FIG. 2A shows the use of a dual core fiber with one laser and a reflector.
Figure 2B:
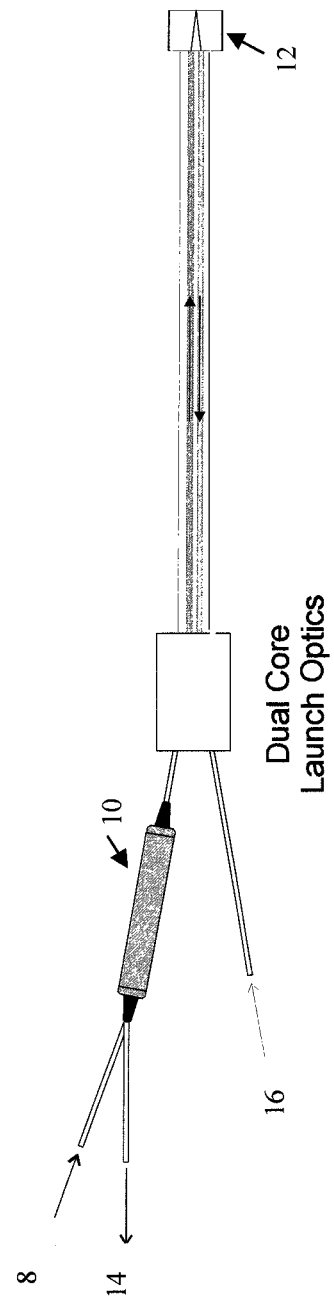
FIG. 2B shows the use of a dual core fiber with two lasers and a reflector.

FIGS. 2A and 2B show two practical examples of how to use the fiber in the field. In FIG. 2A laser light 8 is launched via a circulator or splitter 10 into one fiber core on one end. This connection can be done by aligning the core from the splitter to one core of the fiber. At the other end the light is reflected via reflector 12 from core 1 to core 2. Brillouin scattered light is reflected within both cores along the fiber length and is gathered by a receiver 14 for analysis. In FIG. 2B a second laser 16 launches light into the second fiber core, with the lasers functioning as pump and probe lasers respectively.

Figure 3:
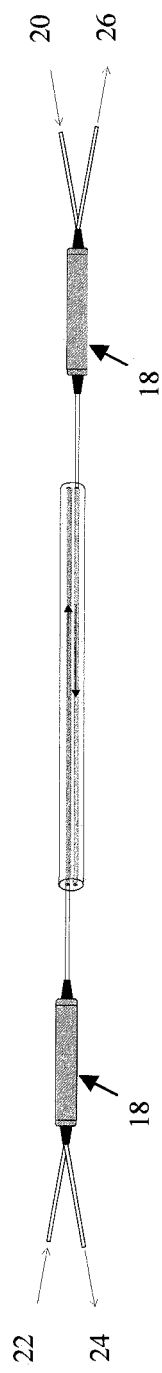
FIG. 3 shows use of a dual core fiber using lasers at opposite ends.

FIG. 3 shows another example of how the invention is used. Circulators/splitters 18 connect lasers 20, 22 and receivers 24, 26 to different fiber cores from opposite ends. The lasers interrogate each fiber core separately and the Brillouin spectra is received from each core for analysis. Similarly, an additional pair of lasers can be added using the method shown in FIG. 2B, to act as pump and probe lasers for each fiber core.

Figure 4:
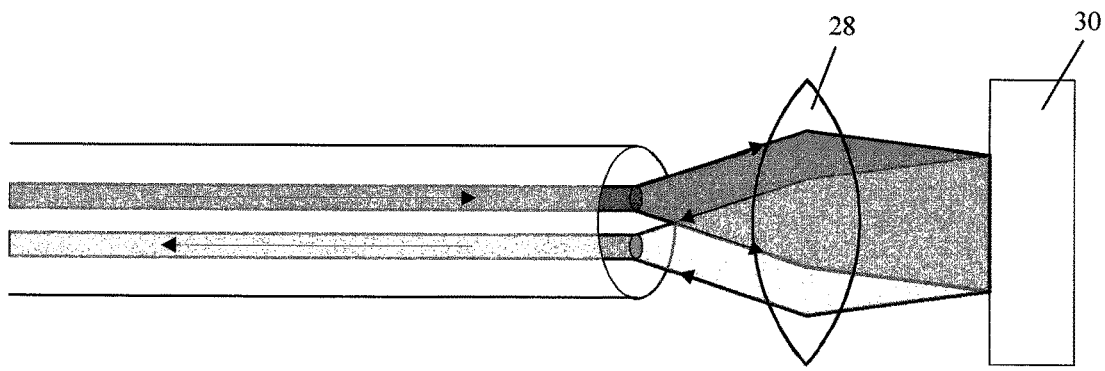
FIG. 4 shows a fiber reflector arrangement.

FIG. 4 illustrates one possible method to reflect light from one fiber core to the other. The end of the fiber is placed at the focal plane of a lens 28. The lens 28 collimates light from the first core. The collimated beam is then reflected by a mirror 30 back through the lens 28, which focuses the light into the second core.

Figure 5:
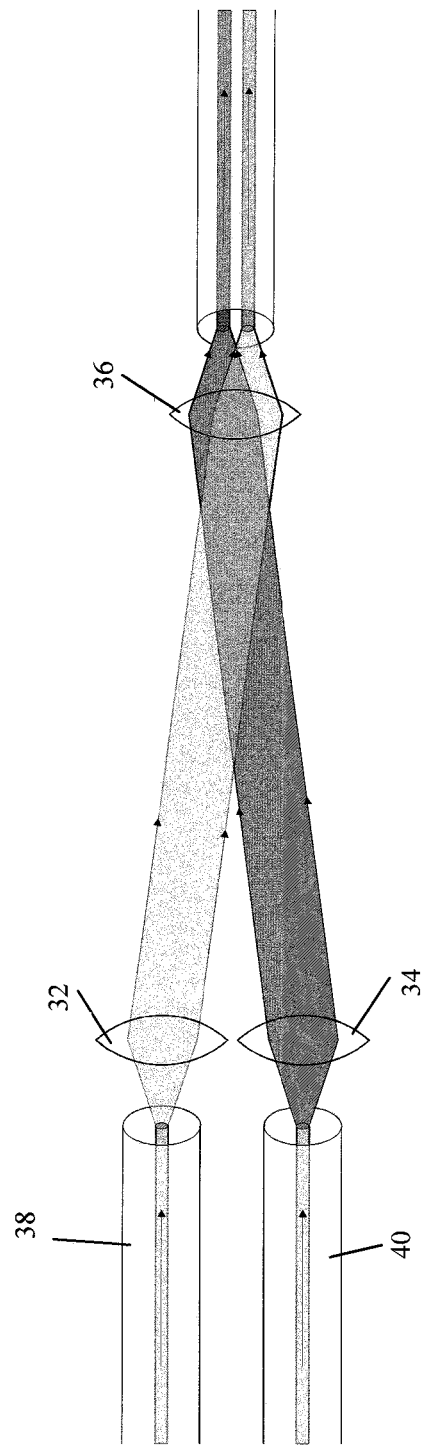
FIG. 5 shows a dual core fiber launch arrangement.

FIG. 5 illustrates one possible method to launch light into both fiber cores simultaneously. The light from each input fiber 38, 40 is collimated by lenses 32, 34, and then directed through a combining lens 36 to focus the light onto each core. The arrangement can also be used in the reverse direction to direct the light from each core into separate fibers.

Other techniques may be used to provide the functions described in FIGS. 4 and 5.

The scope of the claims should not be limited by the preferred embodiments set forth in the examples given above, but should be given the broadest interpretation consistent with the description as a whole.

What is claimed:

1. An optical system comprising:
   a cladding;
   a first optical core within the cladding;
   a second optical core within the cladding having a different refractive index profile and/or composition than the first optical core; and a reflector having a lens configured to collimate light from the first optical core and a mirror configured to reflect the collimated light back through the lens into the second optical core.

2. The system claim 1 further comprising a reflector to couple light from one optical core to the other within the fiber.

\* \* \* \* \*